United States Patent

Houck

[15] 3,670,105

[45] June 13, 1972

[54] PHASING SYSTEM FOR FACSIMILE RECORDERS

[72] Inventor: Deward J. Houck, Mastic Beach, N.Y.

[73] Assignee: International Scanatron Systems, Wyandanch, N.Y.

[22] Filed: Dec. 5, 1969

[21] Appl. No.: 882,483

[52] U.S. Cl. .......... 178/69.5 F
[51] Int. Cl. .......... H04n 1/36
[58] Field of Search .......... 178/69.5 F, 53, 69.5 R; 318/85; 179/15 BS

[56] References Cited

UNITED STATES PATENTS

| | | | |
|---|---|---|---|
| 2,632,810 | 3/1953 | Nyman | 178/69.5 F |
| 2,686,832 | 8/1954 | Fricks | 178/69.5 F |
| 2,873,315 | 2/1959 | Fricks | 178/69.5 F |
| 3,013,121 | 12/1961 | Castor | 178/69.5 F |
| 3,184,546 | 5/1965 | Smith | 178/69.5 F |
| 3,505,472 | 4/1970 | Reese et al. | 178/69.5 R |

OTHER PUBLICATIONS

G. E. Application Note 200.35, March 1966, pp. 1, 4–5.

*Primary Examiner*—Robert L. Griffin
*Assistant Examiner*—John C. Martin
*Attorney*—Alfred W. Barber

[57] ABSTRACT

A phasing system for facsimile recorders seeks to match pulses from the received signal with recorder generated pulses. When the recorder is out of phase with the received signals, a controlled width pulse interrupts the power to the recorder motor causing a predetermined slippage until phasing is corrected.

2 Claims, 4 Drawing Figures

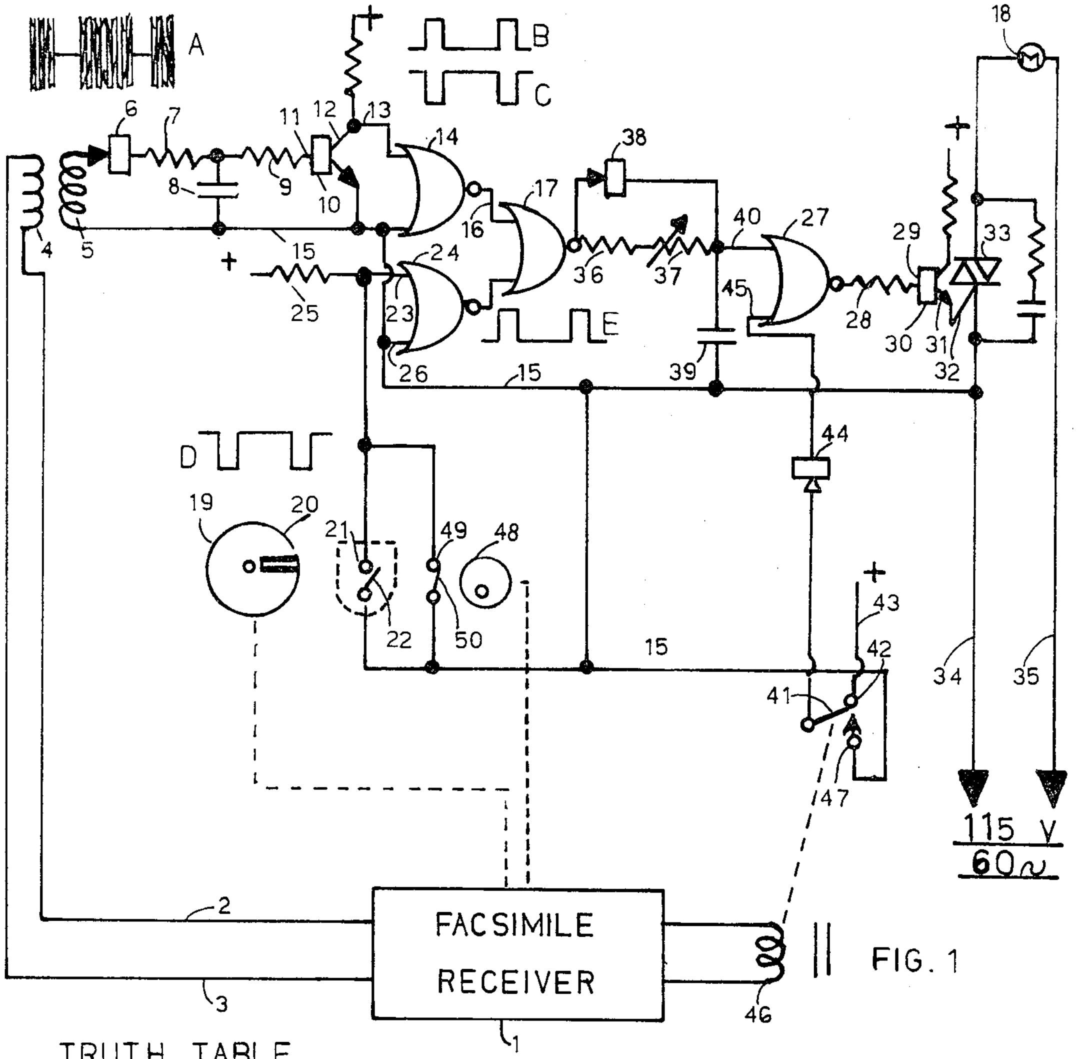
FIG. 1
TRUTH TABLE
| ROW | IN | OR | NOR |
|---|---|---|---|
| 1 | 00 | 0 | 1 |
| 2 | 01 | 1 | 0 |
| 3 | 11 | 1 | 0 |
| 4 | 10 | 1 | 0 |
FIG. 2
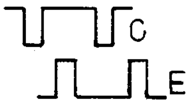
FIG. 3
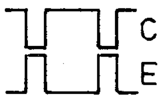
FIG. 4
INVENTOR
DEWARD J. HOUCK
BY
Alfred W. Barber
ATTORNEY

PHASING SYSTEM FOR FACSIMILE RECORDERS

Facsimile recorders are often operated by synchronous motors using the same alternating current power source as that used at the transmitter. By doing this the system is simplified in that no synchronization other than this operation from a common power source is required. However, the phase of the received signal is generally randon so that the receiver, at the start of each transmission, must be brought into phase with the transmitter. One commonly used phasing system compares phasing pulses in the received signal with similar pulses generated at the recorder. The recorder pulses are often produced by a cam operated switch attached to a rotating member of the recorder. Circuits are provided for interrupting the recorder power momentarily as long as the received signal pulses do not match the recorder generated pulses. When a match is achieved, the recorder is in phase with the transmitter and operation continues without interruption, in synchronism and in phase.

Several problems exist with the prior art phasing as described above. The recorder cam switch often becomes unreliable. It also produces a time of power interruption which may be too short so that phasing takes an unduly long time or too long so that phasing becomes inaccurate. Other problems are due to unreliable and inaccurate operation of the relay or other switch used to interrupt the recorder motor power.

SUMMARY

The system of the present invention uses the same principle of phasing as outlined above, i.e., pulses derived from the received signal are matched with recorder generated pulses. There are a number of important improvements, however. The system uses solid state circuits, providing greatly improved reliability and much longer component operating life. The recorder uses a magnet operated reed switch or a photoelectric cell and slitted disc for long, trouble free life and dependable constant pulse width generation. Simple and effective means are provided for controlling the width of the power interruption pulse so that an ideal phasing time may be chosen.

In operation the received phasing signal is rectified and inverted to provide phasing pulses. Pulses are generated by the recorder of substantially the same width as the received pulses. The two sets of pulses are compared. If they do not match, indicating that the receiver is not in phase with the received phasing signal, a resultant phasing pulse is produced. This phasing pulse is adjusted in length to provide the optimum power interruption time for the best phasing time and is applied to a solid state switch to interrupt the recorder motor power. When the phase of the recorder has fallen back to match the transmitter, the motor is operated continuously and the recorder is ready to record the received material.

In the drawings:

FIG. 1 is a simplified schematic circuit diagram, partly in block form, of the preferred form of the present invention.

FIG. 2 is a "truth table" helpful in explaining the operation of the logic blocks of FIG. 1.

FIG. 3 is a set of pulse diagrams characteristic of the out-of-phase operation of the system.

FIG. 4 is a set of pulse diagrams characteristic of the in-phase operation of the system.

The circuit of FIG. 1 starts at the facsimile receiver 1 which in addition to the printing signals for the facsimile recorder, not shown, provides a signal over leads 2 and 3 to the phasing circuit coupled through transformer 4–5. During the phasing period, to be described more fully below, a series of phasing pulses as shown in diagram A are transmitted by the transmitter, received by the receiver and applied to the phasing circuit through transformer 4–5. The maximum positive value of these signals represent logic 1 while the minimum values represent logic 0. These signals are transmitted as modulations of a carrier which is rectified by diode 6 and after filtering by means of resistors 7 and 9 and capacitor 8 are applied to base 11 of transistor 10 in the dc signal form. Transistor 10 amplifies the rectified phasing signals and inverts them so that at collector 12 they appear in inverted form as shown in diagram B. This signal is applied over lead 13 to one input of NOR gate 14. The other input of gate 14 is connected to ground line 15. The NOR gate 14, as well as the other three NOR gates used in the circuit, produces a logic 1 signal at its output when logic 0 is applied to both inputs and a logic 0 when a logic 1 is applied to either or both inputs, as shown in FIG. 2 (truth table). Thus, the output of gate 14 on lead 16 is the inversion of B as shown in diagram C, i.e. since logic 0 (ground 15) is applied to one input, the output is 1 when the other input is 0 and 0 when it is 1. The output on lead 16 of the form shown in diagram C is applied to one input of NOR gate 17 over lead 16. This, then describes the path and sequence of the received phasing signal.

In order to complete the phasing, a phasing signal is also generated by the facsimile machine at the receiving end in response to the rotation of the facsimile recorder, not shown. The facsimile recorder is driven by a synchronous motor 18. Coupled to this motor is a disk 19 geared to make 1 revolution for each line of copy of the facsimile recorder. At or near the perphery of disk 19 is mounted a permanent magnet 20 which closes the contacts of reed switch 21–22 once during each revolution. Closing of reed switch 21–22 shorts input 23 of NOR gate 24 to ground (logic 0) which otherwise receives a logic 1 signal through resistor 25 connected to a source of positive potential, not shown. Thus, the signal on input 23 consists of a logic 1 signal clamped to 0 (logic 0) for a brief interval during each revolution of disk 19 as shown in diagram D. Since the other input, input 26 of gate 24 is held at 0 by its connection to ground line 15, the output of gate 24 comprises a series of logic 1 pulses corresponding to the 0 pulses from the reed switch and magnet, as shown in diagram E. Since disk 19 is geared to and operates in step with the facsimile recorder, pulses E bear a definite phase relationship to the facsimile recording means, not shown. The correct phase between the facsimile recorder and the received signals is attained when the signals of diagrams C and E complement each other, as shown in FIG. 4. When this is the case, a logic 0 appears at the output of NOR gate 17 and in response to this 0 a logic 1 appears at the output of NOR gate 27. This logic 1 is applied through resistor 28 to base 29 of transistor 30 and emitter 31 connected to gate 32 of triac 33 applying continuous power over lines 34 and 35 from a suitable source of AC power. However, if the recorder is not in phase with the received signals, the signals C and E do not complement each other, as shown in FIG. 3, and the positive going pulses of signal C produce logic 1 pulses at the output of gate 17 these pulses are stretched by an adjustable circuit comprising resistor 36 variable resistor 37 shunted by diode 38 and capacitor 39. These adjustable length pulses applied to input 40 of gate 27 produce corresponding logic 0 pulses in the output and applied to base 29 of transistor 30 trigger triac 33 off. With triac 33 off, power is interrupted to facsimile drive motor 18 and it drops momentarily in speed causing the phase of the facsimile recorder to recess a small amount. The length of the pulses being adjustable by means of variable resistor 37 permits adjusting the phase slippage due to each pulse to an amount which will bring the facsimile recorder into exact phase with the received signals in a predetermined maximum time. If the pulses are too short, phasing takes too long. If the pulses are too long, the system gets sloppy and may overshoot exact phasing causing the system to continue to hunt for exact phasing. When phasing is exact, signals C and E complement each other, no more phasing pulses are generated at the output of gate 17 and the facsimile motor operates continuously in synchronism and in phase with the received signals and is ready to start copying received signals.

The sequence of operations is as follows. Initially the normally closed relay switch contacts 41–42 are closed placing a logic 1 signal from a source of voltage, not shown, over lead 43 and through diode 44 on input 45 of gate 27. This logic 1 on its input produces logic 0 on its output and transistor 30 is cut off and triac 33 is open. No power is thus supplied to facsimile motor 18. When a signal is received by facsimile receiver 1, circuits, not shown, energize relay coil 46 opening contacts 41–42 and closing contacts 41–47, removing the logic 1 from input 45 and replacing it by a logic 0. Gate 27 is no longer inhibited and can respond to the phasing pulses as described above. The received signals also, through circuits, not shown, start a timing motor 48 which opens normally closed contacts 49–50 for a predetermined time which is chosen to be sufficient for the phasing process to be completed as set forth above. Contacts 49–50 are connected in parallel with reed switch contacts 21– 22. When contacts 49–50 are open, reed switch 21–22 is in control and operates as described above. At the end of the predetermined phasing interval, timing motor 48 allows contacts 49–50 to close again and the facsimile motor is operated continuously. With switch contacts 49–50 closed a logic 0 is placed on input 23 of NOR gate 24 and since input 26 is permanently connected to ground over lead 15, it too is at logic 0 and the output of NOR gate 24 is a steady logic 1. Since the output of NOR gate 24 is one of the two inputs to NOR gate 17 and is steady logic 1, the output of NOR gate 17 is steady logic 0 (see FIG. 2). Now, NOR gate 27 under these conditions receives logic 0 on input 40 from NOR gate 17 and logic 0 on input 45 through switch contacts 41–47 and hence produces steady logic 1 at its output and on base 29 of transistor 30 keeping triac 33 steadily on and the motor runs steadily without further phasing interruptions. Phasing signals received by facsimile receiver 1 are transmitted during this predetermined phasing interval. At the end of the interval, phasing has been accomplished and the system, operating synchronously and in phase, is ready to receive and record the facsimile picture signals.

I claim:

1. In a facsimile receiving system, phasing means including in combination;

a synchronous motor for driving facsimile recorder means;
means for receiving phasing pulses for phasing said recorder means with remote facsimile transmitting means;
means for generating pulses coupled to said motor;
means for comparing said phasing pulses with said generated pulses to provide pulses indicating an out-of-phase condition between said two sets of pulses;
adjustable pulse stretching means for controlled stretching of said out-of-phase pulses;
means for interrupting power to said motor in accordance with said stretched pulses;
wherein said means for interrupting power to said motor includes a NOR gate for receiving on one of its inputs said shaped pulses and a switch controlled logic 0 on its other input, a transistor coupled to the output of said NOR gate and a triac driven by said transistor;
and wherein said switch is energized to provide said logic 0 in response to power turn-on in said facsimile receiving system;
whereby the time required to phase said recorder with said phasing pulses is controlled by said adjustable pulse stretching means.

2. In a facsimile receiving system, phasing means including in combination;

a synchronous motor for driving facsimile recorder means;
means for receiving phasing pulses for phasing said recorder means with remote facsimile transmitting means;
means for generating pulses coupled to said motor;
means for comparing said phasing pulses with said generated pulses to provide pulses indicating an out-of-phase condition between said two sets of pulses;
adjustable pulse stretching means for controlled stretching of said out-of-phase pulses;
means for interrupting power to said motor in accordance with said stretched pulses;
wherein said means for interrupting power to said motor includes a NOR gate for receiving on one of its inputs said shaped pulses and a switch controlled logic 0 on its other input, a transistor coupled to the output of said NOR gate and a triac driven by said transistor;
wherein said switch is energized to provide said logic 0 in response to power turn-on in said facsimile receiving system;
including a switch controlled source of positive bias coupled to one of the inputs of said NOR gate for inhibiting output from said NOR gate;
and including relay means responsive to received facsimile signals for actuating said switch;
whereby the time required to phase said recorder with said phasing pulses is controlled by said adjustable pulse stretching means.

* * * * *